United States Patent
Fukuda et al.

(10) Patent No.: US 7,127,135 B2
(45) Date of Patent: Oct. 24, 2006

(54) OPTICAL DEVICE WITH LIGHTWAVE CIRCUIT ELEMENT

(75) Inventors: Chie Fukuda, Yokohama (JP); Hiroshi Kohda, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/114,064

(22) Filed: Apr. 26, 2005

(65) Prior Publication Data

US 2005/0254746 A1 Nov. 17, 2005

(30) Foreign Application Priority Data

May 14, 2004 (JP) .............................. 2004-145395

(51) Int. Cl.
*G02B 6/12* (2006.01)
*G02B 6/26* (2006.01)
*G02B 6/42* (2006.01)

(52) U.S. Cl. .............................. 385/14; 385/32; 385/42
(58) Field of Classification Search .................. 385/14, 385/16, 27, 30, 32, 40, 42, 129–132
See application file for complete search history.

(56) References Cited

U.S. PATENT DOCUMENTS 5,862,276 A * 1/1999 Karras .......................... 385/30

6,310,999 B1 10/2001 Marcuse et al. .............. 385/42
6,697,542 B1 * 2/2004 Platzman et al. .............. 385/5
6,937,781 B1 * 8/2005 Shirane et al. ................ 385/16
2004/0126072 A1 * 7/2004 Lee et al. .................... 385/122

FOREIGN PATENT DOCUMENTS

| EP | 0981064 A | 2/2000 |
| JP | 2000-66044 A | 3/2000 |
| JP | 2000-111964 A | 4/2000 |
| JP | 2003-215647 A | 7/2003 |

* cited by examiner

*Primary Examiner*—Sung Pak
*Assistant Examiner*—Daniel Petkovsek
(74) *Attorney, Agent, or Firm*—Global IP Counselors, LLP

(57) ABSTRACT

To provide an optical device whereby the optical characteristics of a lightwave circuit element can be varied with low power consumption. There is provided an optical device comprising a lightwave circuit element having one or plurality of optical waveguides, and also having a refractive index adjusting portion composed of resin located in the one or plurality of optical waveguides and/or in a portion of the area in the one or plurality of optical waveguides. The lightwave circuit element comprises an adjustment-light waveguide for guiding adjustment light that varies the refractive index of the resin, and directing the adjustment light to the adjusting portion.

8 Claims, 5 Drawing Sheets

OPTICAL DEVICE WITH LIGHTWAVE CIRCUIT ELEMENT

BACKGROUND OF THE INVENTION

1. Field of the Invention

The present invention relates to an optical device having a lightwave circuit element.

2. Description of the Background Art

An example of an optical device is a directional coupler that has first and second optical waveguides disposed in mutual proximity in a fixed range and lightwaves guided respectively through each of the waveguides are coupled therebetween.

The optical device disclosed in Japanese Patent Application Publication No. 2003-215647 is provided with a hollow area filled with resin between the first and second optical waveguides in the optical coupling area of the directional coupler which is formed on a substrate. The temperature of the resin is adjusted via an overcladding layer or the substrate. By modifying the temperature of the resin, the refractive index of the resin is changed, and the optical characteristics (optical branching ratio, for example) of the directional coupler are thereby changed.

The optical device disclosed in Japanese Patent Application Publication No. 2000-066044 (corresponding European patent application publication No. 981 064) uses a polymer material in the core area or cladding area. The refractive index of the polymer material is changed and the state (phase, for example) of the light guided through the core area is modified by changing the temperature of the polymer material.

The optical device disclosed in Japanese Patent Application Publication No. 2000-111964 (corresponding U.S. Pat. No. 6,310,999) uses a polymer material in the periphery of the first and second waveguides in the optical coupling area of the directional coupler which is formed on a substrate. The refractive index of the polymer material is changed by modifying the temperature of the polymer material and thereby the optical branching ratio of the directional coupler is changed.

The power required to vary the temperature of the resins is considerable with the optical devices disclosed in the prior art.

SUMMARY OF THE INVENTION

An object of the present invention is to provide an optical device in which the optical characteristics of a lightwave circuit element can be varied with low power consumption.

In order to achieve the stated object, there is provided an optical device comprising a lightwave circuit element having one or plurality of optical waveguides, and also having a refractive index adjusting portion composed of resin and located in the one or plurality of optical waveguides and/or in a portion of the area in the vicinity thereof. The lightwave circuit element comprises an adjustment-light waveguide for guiding adjustment light that varies the refractive index of the resin, and directing the adjustment light to the adjusting portion.

As used herein, the phrase "area in the vicinity" refers to an area in which there is light energy being guided through one or a plurality of waveguides, and is an area in which the state, phase, for example, of the guided waves can be varied by varying the refractive index in the area and thereby the characteristics of the lightwave circuit element can be varied.

Advantages of the present invention will become apparent from the following detailed description, which illustrates the best mode contemplated to carry out the invention. The invention is capable of other and different embodiments, the details of which are capable of modifications in various obvious respects, all without departing from the invention. Accordingly, the accompanying drawing and description are illustrative in nature, not restrictive.

BRIEF DESCRIPTION OF THE DRAWING

The present invention is illustrated by way of example, and not by way of limitation, in the figures of the accompanying drawing in which like reference numerals refer to similar elements.

DETAILED DESCRIPTION OF THE INVENTION

First Embodiment

Figure 1:
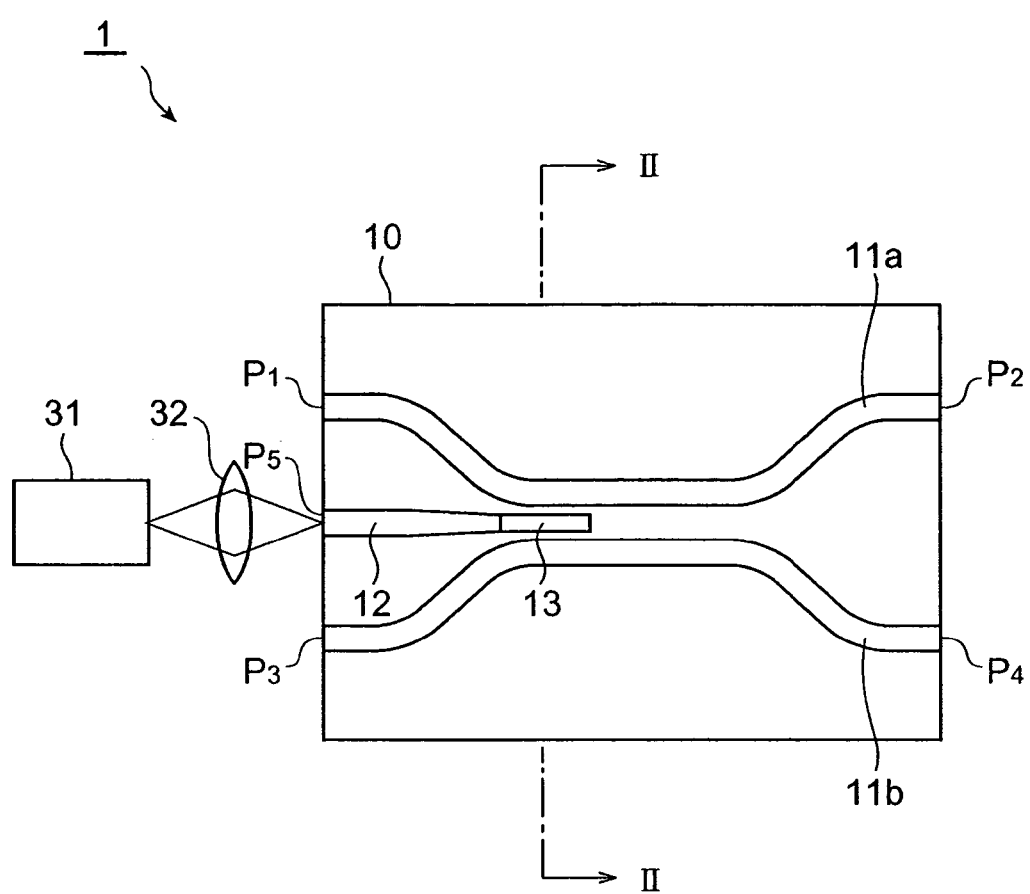
FIG. 1 is a schematic diagram of the optical device of the first embodiment according to the present invention.

FIG. 1 is a schematic diagram of the optical device of the first embodiment according to the present invention. The optical device 1 is provided with a lightwave circuit element 10, a light source 31, and a lens 32. An optical waveguide 11a, an optical waveguide 11b, and an optical waveguide 12 are formed in the lightwave circuit element 10, and a refractive index adjusting portion 13 composed of resin is also provided. In the lightwave circuit element 10, the optical waveguide 11a extends from the end face $P_1$ to the end face $P_2$, the optical waveguide 11b extends from the end face $P_3$ to the end face $P_4$, and the optical waveguide 12 extends from the end face $P_5$ to the adjusting portion 13. The optical waveguide 11a and optical waveguide 11b are mutually proximate in a fixed range, form an optical coupling area in which guided waves are coupled therebetween, and constitute a directional coupler.

The refractive index adjusting portion 13 is disposed in the optical waveguides 11a and 11b or in a portion of the area in the vicinity thereof, and is heated by the incidence of light (adjustment light) guided through the optical waveguide 12. The refractive index can be changed by the evolved heat. The adjusting portion 13 can change the optical branching characteristics of the directional coupler by changing the refractive index of the resin. In the first embodiment, a part of the adjusting portion 13 is disposed in the optical coupling area.

The light source 31 outputs light (adjustment light) with a wavelength that is capable of changing the refractive index of the refractive index adjusting portion 13. The light source 31 is configured so that the optical output power is variable or that switching is possible between light output and stoppage. The wavelength of the adjustment light output from the light source 31 is preferably located in the absorption band of resin, and more preferably matches the wavelength of the absorption peak. The refractive index of the adjusting portion 13 can be effectively changed in this case. The lens 32 condenses the light output from the light source 31 to the end face P$_5$, and the light is directed from the end face P$_5$ to the optical waveguide 12. The optical waveguide 12 guides the light directed to the end face P$_5$ toward the adjusting portion 13, causing the light to enter the adjusting portion 13.

The refractive index adjusting portion 13 is narrow since the material is disposed in the narrow area between the optical waveguide 11a and the optical waveguide 11b. Therefore, light can be efficiently directed to the adjusting portion 13 by making the width of the optical waveguide 12 in the position from which light is emitted from the optical waveguide 12 to the adjusting portion 13 substantially the same as the width of the adjusting portion 13. Conversely, light can be efficiently directed from the exterior to the end face P$_5$ by increasing the width of the optical waveguide 12 in the vicinity of the end face P$_5$. Therefore, the width of the optical waveguide 12 is preferably gradually narrowed from the end face P$_5$ side toward the adjusting portion 13 within a fixed range in the lengthwise direction in the vicinity of the adjusting portion 13.

Figure 2:
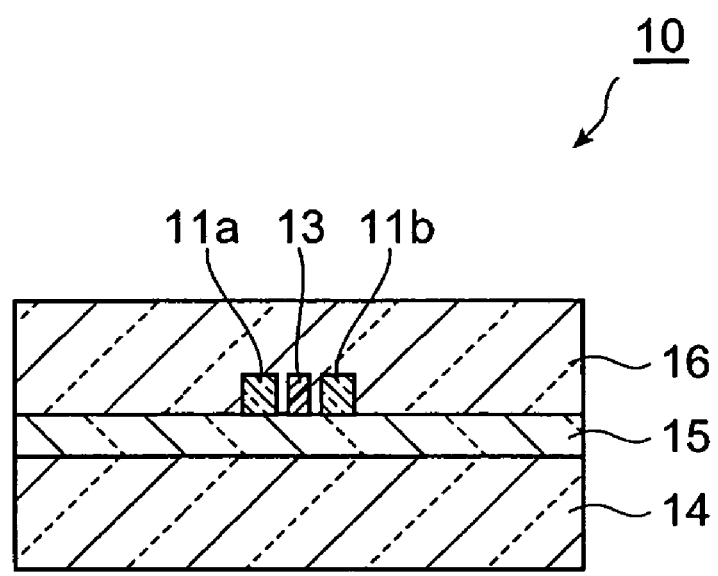
FIG. 2 is a sectional view along the line II—II of FIG. 1.

FIG. 2 is a sectional view along the line II—II of FIG. 1. The lightwave circuit element 10 has an undercladding layer 15 formed on a flat substrate 14, optical waveguides 11a, 11b, and 12 and a refractive index adjusting portion 13 that are formed on a portion of the undercladding layer 15, and an overcladding layer 16 further formed thereon. The adjusting portion 13 is disposed in a position between the optical waveguide 11a and optical waveguide 11b. In this embodiment, the optical waveguides 11a, 11b, and 12; the substrate 14; the undercladding layer 15; and the overcladding layer 16 are composed of silica glass.

The refractive indexes of the optical waveguides 11a, 11b, and 12 are higher than the refractive indexes of the undercladding layer 15 and the overcladding layer 16. The refractive index of the refractive index adjusting portion 13 differs depending on the intensity of the light directed to the adjusting portion 13. In certain cases, it is advantageous for the refractive index of the resin to be equal to the refractive index of the optical waveguides 11a and 11b at the time when the adjustment light is not being directed into the adjusting portion 13. In other cases, it is advantageous for the refractive index of the resin to be equal to the refractive index of the optical waveguides 11a and 11b at the time when the adjustment light at a predetermined power is incident on the adjusting portion 13.

Figure 5:
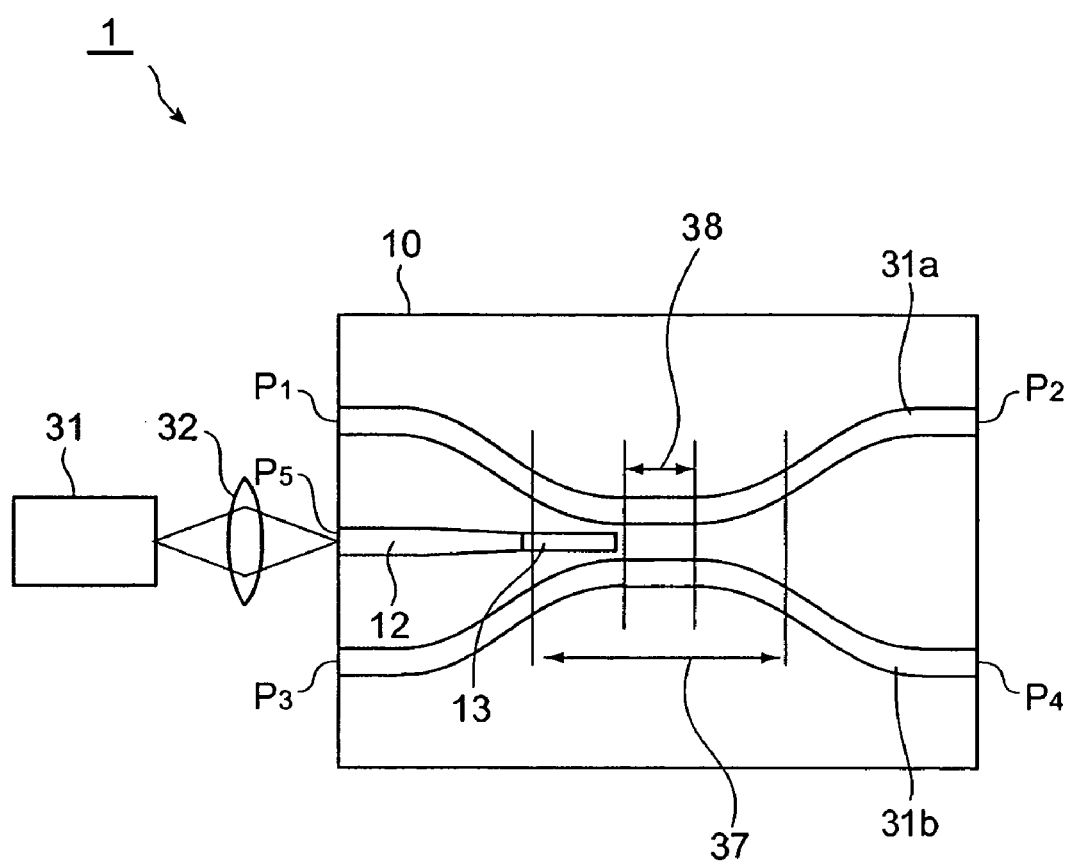
FIG. 5 is a schematic diagram of the optical device of the specific example of the first embodiment according to the present invention.

Next, a specific example of the optical device 1 is described. FIG. 5 is a schematic diagram of the optical device of the specific example of the first embodiment according to the present invention. In this example, the optical waveguide 31a, optical waveguide 31b, optical waveguide 12, substrate 14, undercladding layer 15, and overcladding layer 16 are principally composed of silica glass. GeO$_2$ is added to the optical waveguide 31a, optical waveguide 31b, and optical waveguide 12. The refractive index at the wavelength of 1.55 μm is 1.45.

The thicknesses of the optical waveguide 31a and optical waveguide 31b are 7.5 μm, and the widths thereof are 7.5 μm. The thickness of the optical waveguide 12 is 7.5 μm, and the width thereof is 7.5 μm in a fixed range in the lengthwise direction in the vicinity of the end face P$_5$, but the width gradually decreases toward the refractive index adjusting portion 13 within a fixed range in the lengthwise direction in the vicinity of the adjusting portion 13, and is 3 μm at the position where the light exits to the adjusting portion 13. The space between optical waveguide 31a and optical waveguide 31b in the center portion, linear waveguide portion, 38 of the optical coupling area 37 is 5 μm, and the lengths of the optical waveguides 31a and 31b in the linear waveguide portion 38 are 160 μm.

The refractive index adjusting portion 13 is an epoxy resin, of which the refractive index at a wavelength of 1.55 μm is 1.45, the temperature dependency of the refractive index is −0.0002/K. The resin 13 has absorption peaks in the vicinity of the wavelengths 1.65 μm and 1.1 μm due to its organic groups. The adjusting portion 13 is disposed from 700 μm to 40 μm away from the beginning edge of the linear waveguide portion 38.

The wavelength of the light emitted from the light source 31 is 1.61 μm, substantially matching the absorption peak wavelength of the refractive index adjusting portion 13. The power of the light output from the light source 31 and directed to the adjusting portion 13 is 10 mW. Light with a wavelength of 1.55 μm is directed from the end face P$_1$ to the optical waveguide 31a.

As a result, when light with a power of 10 mW and a wavelength of 1.61 μm enters the refractive index adjusting portion 13, the loss of light with a wavelength of 1.55 μm entering the end face P$_1$ and exiting from the end face P$_2$ is 1.5 dB, and the loss of light with a wavelength of 1.55 μm entering the end face P$_1$ and exiting from the end face P$_4$ is 5.3 dB. Conversely, when light with a wavelength of 1.61 μm is not allowed to enter the adjusting portion 13, the loss of light with a wavelength of 1.55 μm entering the end face P$_1$ and exiting from the end face P$_2$ is 3.1 dB, and the loss of light with a wavelength of 1.55 μm entering the end face P$_1$ and exiting from the end face P$_4$ is 3.1 dB.

Thus, the optical branching ratio of the optical device 1 differs based on whether light with a wavelength of 1.61 μm enters the refractive index adjusting portion 13. Also, the optical branching ratio changes when the power of the light with a wavelength of 1.61 μm entering the adjusting portion 13 changes. It should be noted that even if light with a wavelength of 1.61 μm enters the optical waveguides 31a and 31b at the optical coupling area, the light with a wavelength of 1.61 μm is leaked away from the curved portions of the optical waveguides 31a and 31b.

As described above, since the light to be directed to the refractive index adjusting portion 13 is guided by the optical waveguide 12 in the first embodiment, the light is guided with good efficiency to the adjusting portion 13, and the optical branching ratio of the directional coupler can be varied with low power consumption.

(Second Embodiment)

Figure 3:
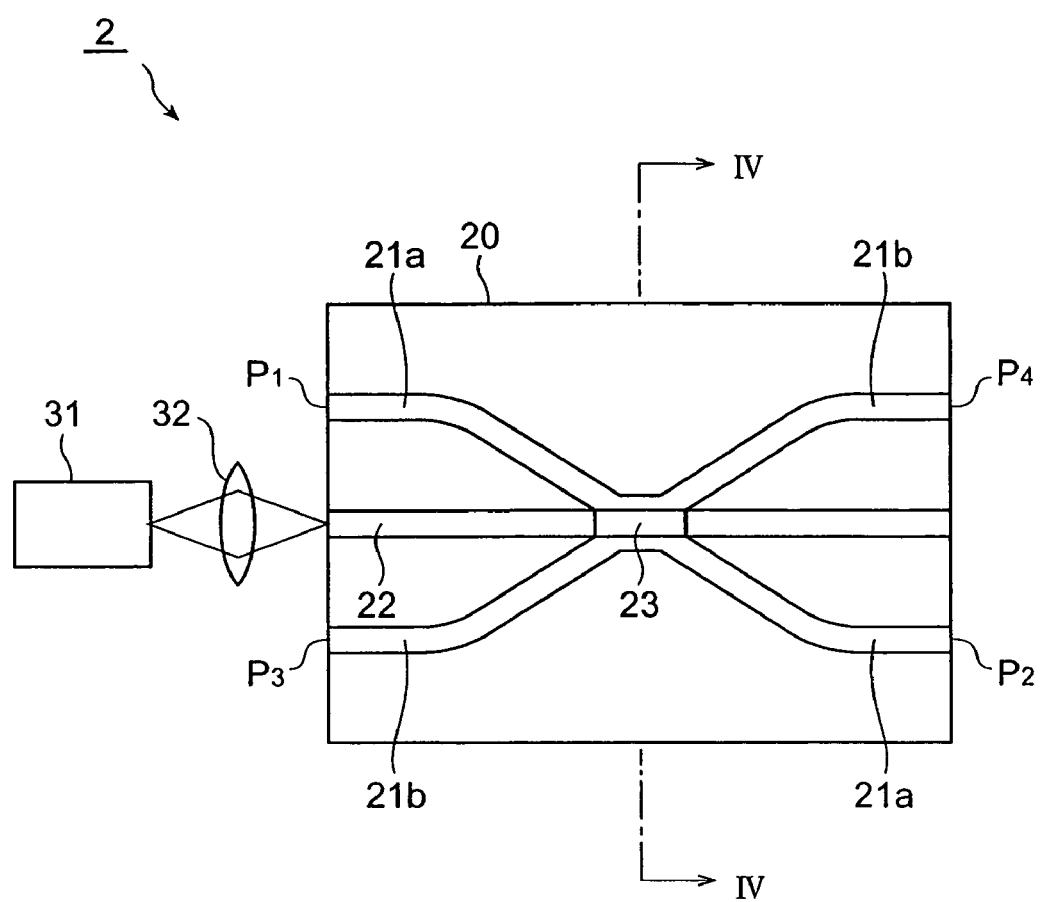
FIG. 3 is a schematic diagram of the optical device of the second embodiment of according to the present invention.

FIG. 3 is a schematic diagram of the optical device of the second embodiment according to the present invention. The optical device 2 is provided with a lightwave circuit element 20, a light source 31, and a lens 32. An optical waveguide 21a, an optical waveguide 21b, and an optical waveguide 22 are formed in the lightwave circuit element 20, and a refractive index adjusting portion 23 composed of resin is also provided. In the lightwave circuit element 20, the optical waveguide 21a extends from the end face P$_1$ to the end face P$_2$, the optical waveguide 21b extends from the end face P$_3$ to the end face P$_4$, and the optical waveguide 22 extends from the P$_5$ to the adjusting portion 23. The optical waveguide 21a and optical waveguide 21b mutually intersect to form an intersecting area.

The refractive index adjusting portion 23 is disposed in the optical waveguides 21a and 21b or in a portion of the area in the vicinity thereof, and is heated by the incidence of light (adjustment light) guided through the optical waveguide 22. The refractive index of the adjusting portion can be changed by the evolved heat. The polymer material 23 can change the optical propagation characteristics of the optical waveguides 21a and 21b by changing the refractive index thereof. In the second embodiment, the polymer material 23 is disposed in the intersecting area.

The light source 31 outputs light with a wavelength capable of changing the refractive index of the refractive index adjusting portion 23. The light source 31 is configured so that the optical output power is variable or that switching is possible between light output and stoppage. The wavelength of the adjustment light output from the light source 31 preferably matches the wavelength of the absorption peak of the adjusting portion 23. The refractive index of the adjusting portion 23 can be effectively changed in this case. The lens 32 condenses the light output from the light source 31 to the end face $P_5$, and the light is directed from the end face $P_5$ to the optical waveguide 22. The optical waveguide 22 guides the light directed to the end face $P_5$ toward the adjusting portion 23, causing the light to enter the adjusting portion 23.

Figure 4:
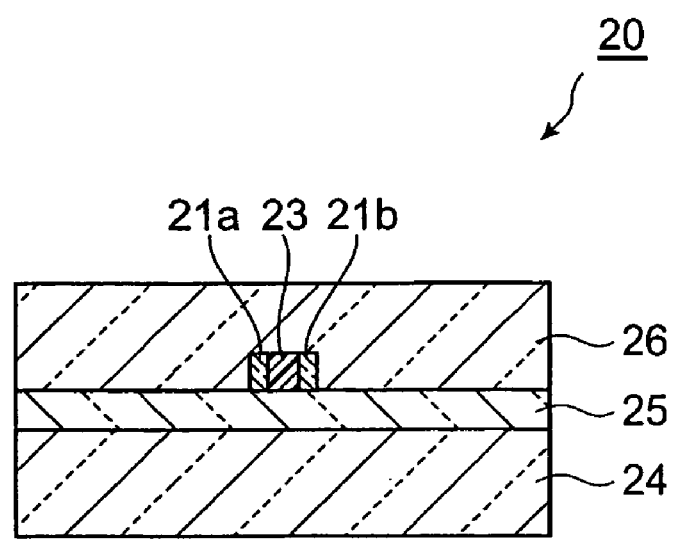
FIG. 4 is a sectional view along the line IV—IV of FIG. 3.

FIG. 4 is a sectional view along the line IV—IV of FIG. 3. The lightwave circuit element 20 has an undercladding layer 25 formed on a flat substrate 24; optical waveguides 21a, 21b, and 22 formed on a portion of the undercladding layer 25 together with a refractive index adjusting portion 23 provided thereto; and an overcladding layer 26 further formed thereon. The adjusting portion 23 is disposed in the intersecting area where the optical waveguide 21a and optical waveguide 21b mutually intersect. In the second embodiment, the optical waveguides 21a, 21b, and 22; the substrate 24; the undercladding layer 25; and the overcladding layer 26 are composed of silica glass.

The refractive indexes of the 21a, 21b, and 22 are higher than the refractive indexes of the undercladding layer 25 and the overcladding layer 26. The refractive index of the refractive index adjusting portion 23 differs depending on the intensity of the light output and directed from the light source 31. In certain cases, it is advantageous for the refractive index of the resin to be equal to the refractive index of the optical waveguides 21a and 21b when the adjustment light is not being directed into the adjusting portion 23. In other cases, it is advantageous for the refractive index of the resin to be equal to the refractive index of the optical waveguides 21a and 21b when the adjustment light at a predetermined power is incident on the adjusting portion 23.

Next, a specific example of the optical device 2 is described. In this example, the optical waveguide 21a, the optical waveguide 21b, the optical waveguide 22, the substrate 24, undercladding layer 25, and the overcladding layer 26 are principally composed of silica glass. $GeO_2$ is added to the optical waveguide 21a, the optical waveguide 21b, and the optical waveguide 22, and the refractive index at the wavelength of 1.55 µm is 1.45. The heights of the optical waveguide 21a, the optical waveguide 21b, and the optical waveguide 22 are 7.5 µm, and the widths thereof are 7.5 µm.

The refractive index adjusting portion 23 is an epoxy resin, the refractive index at a wavelength of 1.55 µm is 1.45, the temperature dependency of the refractive index is −0.0002/K, and the resin has absorption peaks in the vicinity of the wavelengths 1.65 µm and 1.1 µm due to organic groups. The adjusting portion 23 is disposed in the intersecting area.

The wavelength of the light emitted from the light source 31 is 1.1 µm, substantially matching the absorption peak wavelength of the refractive index adjusting portion 23. The power of the light directed to the adjusting portion 23 is 100 mW. Light with a wavelength of 1.55 µm is directed from the end face $P_1$ to the optical waveguide 21a.

As a result, when light with a power of 100 mW and a wavelength of 1.1 µm is incident on the refractive index adjusting portion 23, the light with a wavelength of 1.55 µm directed to the end face $P_1$ travels through the optical waveguide 21a and arrives at the adjusting portion 23, whereupon the light is reflected by the polymer material 23, guided by the optical waveguide 21b, and emitted to the exterior from the end face $P_4$. When light with a wavelength of 1.1 µm does not enter the adjusting portion 23, the light with a wavelength of 1.55 µm incident on the end face $P_1$ travels through the optical waveguide 21a and arrives at the adjusting portion 23, whereupon the light is transmitted by the adjusting portion 23, guided by the optical waveguide 21a, and emitted to the exterior from the end face $P_2$.

Thus, depending on whether the light with a wavelength of 1.1 µm is incident on the refractive index adjusting portion 23, the optical device 2 can switch between whether the light with the wavelength of 1.55 µm directed to the end face $P_1$ is emitted from the end face $P_2$ or the end face $P_4$. In other words, the optical device 2 can operate as an optical switch.

As described above, since the light to be directed to the refractive index adjusting portion 23 is guided by the optical waveguide 22 in the second embodiment, the light is guided with good efficiency to the adjusting portion 23, and switching operations can be carried out with low power consumption.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese Patent Application Publication No. 2004-145395 filed on May 14, 2004 including specification, claims, drawings, and summary are incorporated herein by reference in its entirety.

What is claimed is:

1. An optical device comprising:
   a lightwave circuit element having a plurality of optical waveguides, the plurality of optical waveguides comprising a first optical waveguide and a second optical waveguide that is disposed proximate to the first optical waveguide in a fixed range to form an optical coupling area together with the first optical waveguide; and
   a refractive index adjusting portion composed of resin and located in the plurality of optical waveguides and/or in a portion of the area in the vicinity of the plurality of optical waveguides,
   wherein the lightwave circuit element further comprises an adjustment-light waveguide for guiding adjustment light that varies the refractive index of the resin and directs the adjustment light to the refractive index adjusting portion,
   the optical coupling area comprises a linear waveguide portion and the refractive index adjusting portion is disposed away from the linear waveguide portion but at least a part of the refractive index adjusting portion is located in the optical coupling area, and
   the wavelength of the adjustment light falls within the absorption band of the resin and the resin is heated by the adjustment light such that the refractive index of the resin is changed.

2. The optical device according to claim 1, further comprising a light source for outputting and directing the adjustment light to the adjustment-light waveguide.

3. The optical device according to claim 2, wherein the refractive index of the resin is equal to the refractive index of the plurality of optical waveguides when the adjustment light is not incident on the refractive index adjusting portion.

4. The optical device according to claim 2, wherein the refractive index of the resin is equal to the refractive index of the plurality of optical waveguides when the adjustment light at a predetermined power is incident on the refractive index adjusting portion.

5. An optical device comprising:
- a lightwave circuit element having a plurality of optical waveguides, the plurality of optical waveguides comprising a first optical waveguide and a second optical waveguide that intersects the first optical waveguide to form an intersecting area together with the first optical waveguide, and
- a refractive index adjusting portion composed of resin, the refractive index adjusting portion being located in the intersecting area and contacting the first optical waveguide and the second optical waveguide,
- wherein the lightwave circuit element comprises an adjustment-light waveguide for guiding adjustment light that varies the refractive index of the resin, and directs the adjustment light to the refractive index adjusting portion, and
- the wavelength of the adjustment light falls within the absorption band of the resin and the resin is heated by the adjustment light such that the refractive index of the resin is changed.

6. The optical device according to claim 5, further comprising a light source for outputting and directing the adjustment light to the adjustment-light waveguide.

7. The optical device according to claim 6, wherein the refractive index of the resin is equal to the refractive index of the plurality of optical waveguides when the adjustment light is not incident on the refractive index adjusting portion.

8. The optical device according to claim 6, wherein the refractive index of the resin is equal to the refractive index of the plurality of optical waveguides when the adjustment light at a predetermined power is incident on the refractive index adjusting portion.

* * * * *